Patented May 4, 1948

2,441,032

UNITED STATES PATENT OFFICE 2,441,032

ACYL THIOCARBAMO SULFENAMIDES AS NEW CHEMICALS

Philip T. Paul, Naugatuck, Conn., assignor to United States Rubber Company, New York, N. Y., a corporation of New Jersey No Drawing. Application June 18, 1945, Serial No. 600,209

4 Claims. (Cl. 260—551)

This invention relates to new sulfenamide chemicals.

The new chemicals are referred to as monoacyl thiocarbamo sulfenamides in which the thiocarbamo nitrogen atom is a tertiary amino nitrogen atom. They conform to the formula

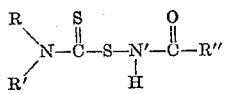

R and R' each represent any univalent organic group, and may together form a single divalent group. For example, R and R' may be the same or different, substituted or unsubstituted, alkyl (saturated or unsaturated), aryl, aralkyl, or alicyclic groups, or are united to form a closed ring structure, as illustrated by methyl, ethyl, propyl, butyl, amyl, hexyl, allyl, methallyl, benzyl, cyclohexyl, pentamethylene, oxydiethylene, beta chloroethyl, beta methoxy ethyl, etc. Groups like the benzyl group are recognized as functionally aliphatic groups, even though they contain a benzene ring. R'' is an alkyl group as illustrated by methyl, ethyl, propyl, butyl, amyl, dodecyl, etc.

The chemicals may be prepared by acylating with a mono-basic acid, and with the appropriate ketene, the selected sulfenamide (A—CS$_2$—NH$_2$; A being the aforesaid tertiary nitrogen atom).

Exemplary of chemicals conforming to the above are:

N,N-diethyl N'-acetyl thiocarbamo sulfenamide
N,N-diallyl N'-acetyl thiocarbamo sulfenamide
N,N-dipropyl N'-acetyl thiocarbamo sulfenamide
N,N-diamyl N'-acetyl thiocarbamo sulfenamide
N,N-dibutyl N'-acetyl thiocarbamo sulfenamide
N,N-dibenzyl N'-acetyl thiocarbamo sulfenamide
N,N-dimethyl N'-propionyl thiocarbamo sulfenamide
N,N-dimethyl N'-butyryl thiocarbamo sulfenamide
N,N-dimethyl N'-valeryl thiocarbamo sulfenamide
N,N-diphenyl N'-acetyl dithiocarbamo sulfenamide
N-methyl, N-phenyl N'-acetyl dithiocarbamo sulfenamide.

The following example illustrates in more detail the preparation of the chemicals:

EXAMPLE 1

*Preparation of N,N-diethyl N'-acetyl thiocarbamo sulfenamide*

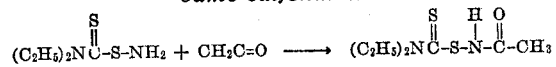

To a solution of 35 g. N,N-diethyl thiocarbamo sulfenamide (U. S. Patent No. 2,318,482) in 200 cc. dry ether, ketene (from 500 cc. acetone) is introduced over a 6 hour period. The temperature of reaction is held at 20° C. and additional ether is added to keep the volume constant. At the end of the reaction the ether is evaporated and the residual oil crystallizes on standing. Recrystallized from a benzene-ligroin mixture. Melting points 67° C. Yields 19.6 g.

Similarly, when N,N-dimethyl thiocarbamo sulfenamide is reacted with the ketene in the above procedure, there is obtained N,N-dimethyl N'-acetyl thiocarbamo sulfenamide, M. P. 136° C.; using morpholyl thiocarbamo sulfenamide for reaction with the same ketene in the above procedures results in N-oxydiethylene N-acetyl thiocarbamo sulfenamide, M. P. 163–164° C.; using N,N-diphenyl thiocarbamo sulfenamide (M. P. 149° C.), there is obtained N,N-diphenyl N'-acetyl thiocarbamo sulfenamide, M. P. 167° C.; and from N-methyl N-phenyl thiocarbamo sulfenamide (M. P. 86–87° C.), N-methyl N-phenyl N'-acetyl thiocarbamo sulfenamide M. P. 127–128° C. is prepared.

The chemicals may be used as such or as intermediates.

One use of the chemicals is as accelerators of vulcanization of sulfur-vulcanizable elastomers (natural or synthetic). This is illustrated below, using GR–S which is the synthetic elastomer known generally as the butadiene-styrene copolymer rubber.

EXAMPLE 2

*Master batch*

| | Parts by weight |
|---|---|
| GR–S | 100 |
| Sulfur | 2.0 |
| Coal tar softener | 5.0 |
| Carbon black | 50.0 |
| Stearic acid | 2.0 |
| Zinc oxide | 5.0 |
| | 164.0 |

| | A | B |
|---|---|---|
| Above Master Batch | 164.0 | 164.0 |
| N-oxydiethylene N'-acetyl thiocarbamo sulfenamide | 0.5 | |
| N,N-dimethyl N'-acetyl thiocarbamo sulfenamide | | 0.5 |

Cure: 45 minutes at 45 pounds per square inch steam pressure.

Tensiles

| Stock A | | Stock B | |
|---|---|---|---|
| T | E | T | E |
| 490 | 300 | 1,180 | 300 |
| 1,400 | 500 | | |
| 2,280 | ¹ 695 | 2,630 | ¹ 587 |

¹ Break.
T—means tensile in pounds per square inch.
E—means elongation at break.

Having thus described my invention, what I claim and desire to protect by Letters Patent is:

1. An N,N-dialkyl N'-mono-acyl thiocarbamo sulfenamide, where acyl stands for carbonyl directly attached to an aliphatic hydrocarbon radical.

2. N,N-dimethyl N'-acetyl thiocarbamo sulfenamide.

3. Compounds of the formula $$\begin{matrix} R & & S & & O \\ & \diagdown & \| & & \| \\ & N-C-S-N'-CR'' \\ & \diagup & & H \\ R' & & & \end{matrix}$$

where R'' is an alkyl radical; and R and R' each represent a hydrocarbon radical.

4. N-methyl N-phenyl N'-acetyl thiocarbamo sulfenamide.

PHILIP T. PAUL.

REFERENCES CITED

The following references are of record in the file of this patent:

UNITED STATES PATENTS

| Number | Name | Date |
|---|---|---|
| 2,318,482 | Hauslick | May 4, 1943 |
| 2,333,468 | Cooper | Nov. 2, 1943 |
| 2,342,332 | Dean | Feb. 22, 1944 |
| 2,386,457 | Hauslick | Oct. 9, 1945 |
| 2,432,256 | Skaptason | Dec. 9, 1947 |

Certificate of Correction

Patent No. 2,441,032.

May 4, 1948.

PHILIP T. PAUL

It is hereby certified that error appears in the printed specification of the above numbered patent requiring correction as follows: Column 2, line 20, for "136° C." read *135° C.*; and that the said Letters Patent should be read with this correction therein that the same may conform to the record of the case in the Patent Office.

Signed and sealed this 13th day of July, A. D. 1948.

[SEAL]

THOMAS F. MURPHY,
*Assistant Commissioner of Patents.*